United States Patent [19]
Engelbrite

[11] Patent Number: 6,126,447
[45] Date of Patent: Oct. 3, 2000

[54] COLOR-ASSONANT PHONETICS SYSTEM

[76] Inventor: L. Eve Engelbrite, 709 N. Brandon Dr., Chandler, Ariz. 85226

[21] Appl. No.: 08/986,604

[22] Filed: Dec. 8, 1997

[51] Int. Cl.⁷ .................................................. G09B 17/00
[52] U.S. Cl. .......................... 434/167; 434/170; 434/178
[58] Field of Search .................................... 434/167, 170, 434/178, 184

[56] References Cited

U.S. PATENT DOCUMENTS

| | | |
|---|---|---|
| 1,428,456 | 9/1922 | Stranders . |
| 1,732,980 | 10/1929 | Mooney ................................ 434/170 |
| 3,407,515 | 10/1968 | Pitman ................................. 434/185 |
| 3,426,451 | 2/1969 | Hoffman .............................. 434/178 |
| 3,715,812 | 2/1973 | Novak .................................... 35/35 |
| 4,030,211 | 6/1977 | McGinley ............................. 434/167 |
| 4,115,932 | 9/1978 | Charlesworth ....................... 434/167 |
| 4,193,212 | 3/1980 | Al-Kufaishi ......................... 434/178 |
| 4,245,587 | 1/1981 | Cooper ................................. 434/167 |
| 4,270,284 | 6/1981 | Skellings ............................. 434/156 |
| 4,443,199 | 4/1984 | Sakai ................................... 434/170 |
| 4,609,357 | 9/1986 | Clegg .................................. 434/167 |
| 4,643,680 | 2/1987 | Hill ..................................... 434/170 |
| 4,655,713 | 4/1987 | Weiss .................................. 434/178 |
| 5,197,883 | 3/1993 | Johnston ............................. 434/167 |
| 5,306,153 | 4/1994 | Foster ................................. 434/170 |
| 5,429,513 | 7/1995 | Diaz-Plaza ......................... 434/167 |

*Primary Examiner*—Robert A. Hafer
*Assistant Examiner*—Kurt Fernstrom

[57] ABSTRACT

A color-assonant phonetics system for the English language to facilitate reading and pronunciation. It applies three styles of any font and fifteen colors (including black) to the letters of the English alphabet on any white background. All consonant phonemes are black letters and all vowel phonemes are letters colored by a color whose name rhymes with the vowel's sound. Uncommon phonemes are slanted letters. Silent letters are thin.

Webster's Dictionary's second definition of "assonance" is "vowel rhyme". Webster's Dictionary's definition of "phoneme" is "the basic distinctive units of speech sound by which morphemes, words, and sentences are represented." Webster's Dictionary's third definition of "phonetics" is "the symbols used to represent the speech sounds of a language."

3 Claims, 6 Drawing Sheets

(6 of 6 Drawing Sheet(s) Filed in Color)

T N

RED

PINK

BL ND

PLUM

Fig. 1

GRAY

GREEN

LIME

ORANGE

BLUE

Fig. 2

BROOK

BROWN

TURQUOISE

PURPLE

Fig. 3

| | | | | | |
|---|---|---|---|---|---|
| c | city | /s/ | s | has | /z/ |
| | ocean | /sh/ | | treasure | /zh/ |
| | cello | /ch/ | | sugar | /sh/ |
| d | passed | /t/ | t | nation | /sh/ |
| | soldier | /j/ | | picture | /ch/ |
| f | of | /v/ | | equation | /zh/ |
| g | gym | /j/ | x | exit | /gz/ |
| | beige | /zh/ | | xylophone | /z/ |
| q | plaque | /k/ | z | azure | /zh/ |

| | | | | | |
|---|---|---|---|---|---|
| ch | church | /ch/ | wh | wheel | /hw/ |
| | chute | /sh/ | gh | laugh | /f/ |
| sh | ship | /sh/ | ph | phone | /f/ |
| th | the (voiced) | | ng | sing | /ŋ/ |
| | thin (unvoiced) | | nk | sink | /ŋk/ |

Fig. 4 lamb, czar, judge, sign, school, knee, would, hymn, psalm, watch, wrote, yacht, thought

Fig. 5

I w nt to jo in *the* go od peopl  o*f*

Gold Town  n say*ng*

*th* t a m n  s w  o*rth* m re *th*an one's mon ey belt.

Fig. 6

COLOR-ASSONANT PHONETICS SYSTEM

This file of this patent contains at least one drawing executed in color. Copies of this patent with color drawings will be provided by the Patent and Trademark Office upon request and payment of the necessary fee.

A portion of the disclosure of this patent document contains material that is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND—FIELD OF THE INVENTION

This invention relates to the field of pronunciation and reading aids. More particularly, it introduces a new color-assonant phonetics system for the English language.

BACKGROUND—PRIOR APPLICATIONS

A previous patent application for this invention, Ser. No. 08/514,972, was abandoned. This color-assonant phonetics system for the English language was incorporating into a software product called "Color Phonics" that contains five CD-ROM's and two reference cards and a manual. The "Color Phonics" product was published nationwide on Feb. 21, 1997, and it is selling where it is made known.

The date of first use anywhere of the "Color Phonics" mark was Jul. 31, 1995, as verified by the PTO (#75/351080). The "Color Phonics" pronunciation guide was copyrighted Aug. 15, 1995 (#Txu 649-643).

BACKGROUND—DESCRIPTION OF PRIOR ART

Public domain pronunciation guides and patented phonetic systems to English contain extraneous symbols (diacritical marks) which detract from the flow of text. U.S. Pat. No. 4,609,357, issued to Gwendolyn Clegg on Sep. 2, 1986, and U.S. Pat. No. 5,197,883, issued to Louise Johnston on Jul. 23, 1992, use diacritical marks. U.S. Pat. No. 4,655,713, issued to Martin Weiss on Mar. 15, 1985, uses contrast in color, intensity, and typeface, but he also adds extra symbols to the words. U.S. Pat. No. 4,030,211 issued to Edward McGinley on Feb. 10, 1976, does not use colors at all, but uses a unique placement of letters on a chart.

Reading aids have made use of color for many years. U.S. Pat. No. 1,428,456, issued to Walter Stranders on Sep. 5, 1922 and U.S. Pat. No. 5,306,153 issued to Margaret Foster on Apr. 26, 1993, use color to associate particular letters with corresponding strips below an illustration to enhance spelling. U.S. Pat. No. 4,270,284 issued to Edmund Skellings on Sep. 19, 1978, uses colors to highlight various aspects of text such as assimilation or rhythm or grammar. There is no permanent one-to-one correspondence of a color to a sound.

U.S. Pat. No. 1,732,980, issued to A. S. Mooney on Oct. 22, 1929, uses selected colors "physiologically" related to the vowels' spellings, but not assonantally related to the vowels' sounds. U.S. Pat. No. 4,443,199, issued to Margaret Sakai on Apr. 17, 1984, uses non-assonant colors for both consonant and vowel sounds. U.S. Pat. No. 3,715,812, issued to Lorna Novak on Feb. 13, 1973, colorizes both consonants and vowels. U.S. Pat. No. 5,429,513, issued to Ruth Diaz-Plaza on Jul. 4, 1995, uses red for all vowel sounds. "Each of the distinctive colors corresponds to a characteristic of sound production"—the place of articulation, not the actual sound produced. U.S. Pat. No. 4,115,932, issued to Rita Charlesworth on Jul. 15,1977, does use the following assonant colors for vowel sounds: blue, orange, purple, brown, and turquoise; but the long vowels are green, and all five short vowels (as well as certain consonant digraphs) are red. The letters are not colored, but are white upon a colored background tile.

U.S. Pat. No. 4,643,680, issued to John Hill on Feb. 17, 1987, uses black and white in his set of assonant colors for vowel sounds. He uses outline for silent letters. U.S. Pat. No. 3,407,515, issued to I. J. Pitman on Oct. 29, 1968, uses bold letters to indicate syllabic stress. U.S. Pat. No. 3,426,451, issued to Banesh Hoffmann on Feb. 11, 1969, uses dotted letters for silent letters.

OBJECTS AND ADVANTAGES

For seventy years color-coded phonetic systems and reading aids have been patented. Many of the inventions use various colors and styles to represent the basic sounds of English. None fully incorporates the unique one-to-one correspondence of an assonant color to each vowel sound, slanted letters representing uncommon sounds, and silent letters being thin. Several objects and advantages of this phonetics system are evident:

(a) It provides clear, immediate, visual distinction between consonant sounds and vowel sounds.

(b) It provides one-to-one correspondence of an assonant color to each vowel sound including schwas.

(c) It provides clear, immediate recognition of the number of syllables in each word.

(d) It visually distinguishes all of the different vowel sounds from each other regardless of spellings.

(e) It provides clear, immediate recognition of silent letters.

(f) It provides inferential visual cues instead of complex rules, thus enabling students to spend less time learning the system and more time using the system to aid their pronunciation and reading.

(g) It provides a readable text to both those who know the system and those who do not, without distorting text with diacritical marks.

(h) It can be used in many mediums, fonts, and sizes.

Further objects and advantages of the invention will become apparent from a consideration of the drawings and ensuing description.

BRIEF DESCRIPTION OF THE DRAWINGS

The file of this patent contains drawings executed in color. Copies of this patent with color drawings will be provided by the U.S. Patent and Trademark office upon request and payment of the necessary fee.

SUMMARY

This color-assonant phonetics system for the English language applies thickness of a font, slanted styles of a font, and fifteen colors (including black) to the letters of the English alphabet on any white background to facilitate pronunciation and reading. All consonant sounds are black letters and all vowel sounds are letters colored by a color whose name rhymes with the vowel's sound. Uncommon sounds are slanted letters, and silent letters are thin.

DESCRIPTION

Figure 1:
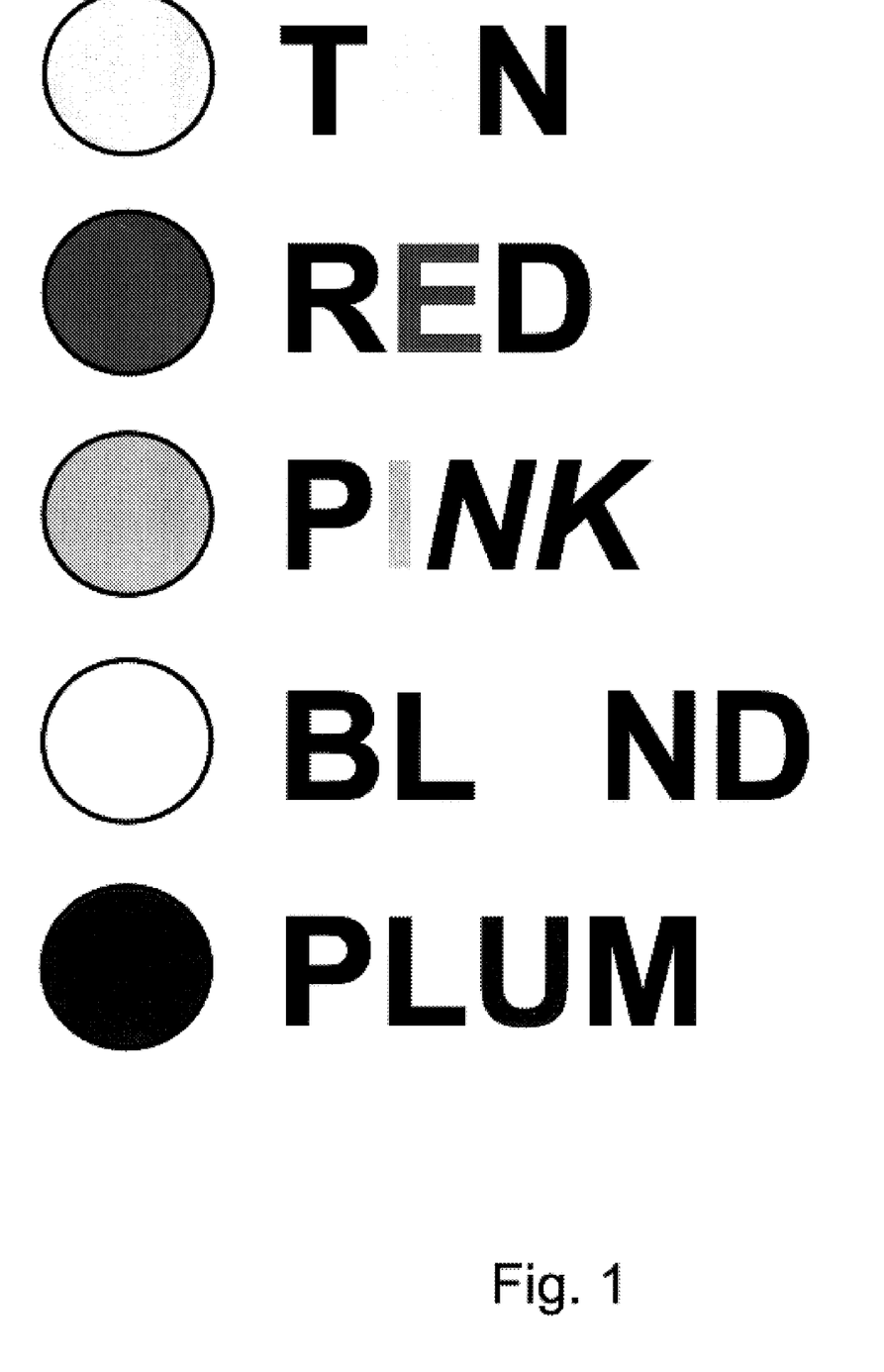
FIG. 1 portrays the colors and color names of the five short vowel sounds.
Figure 2:
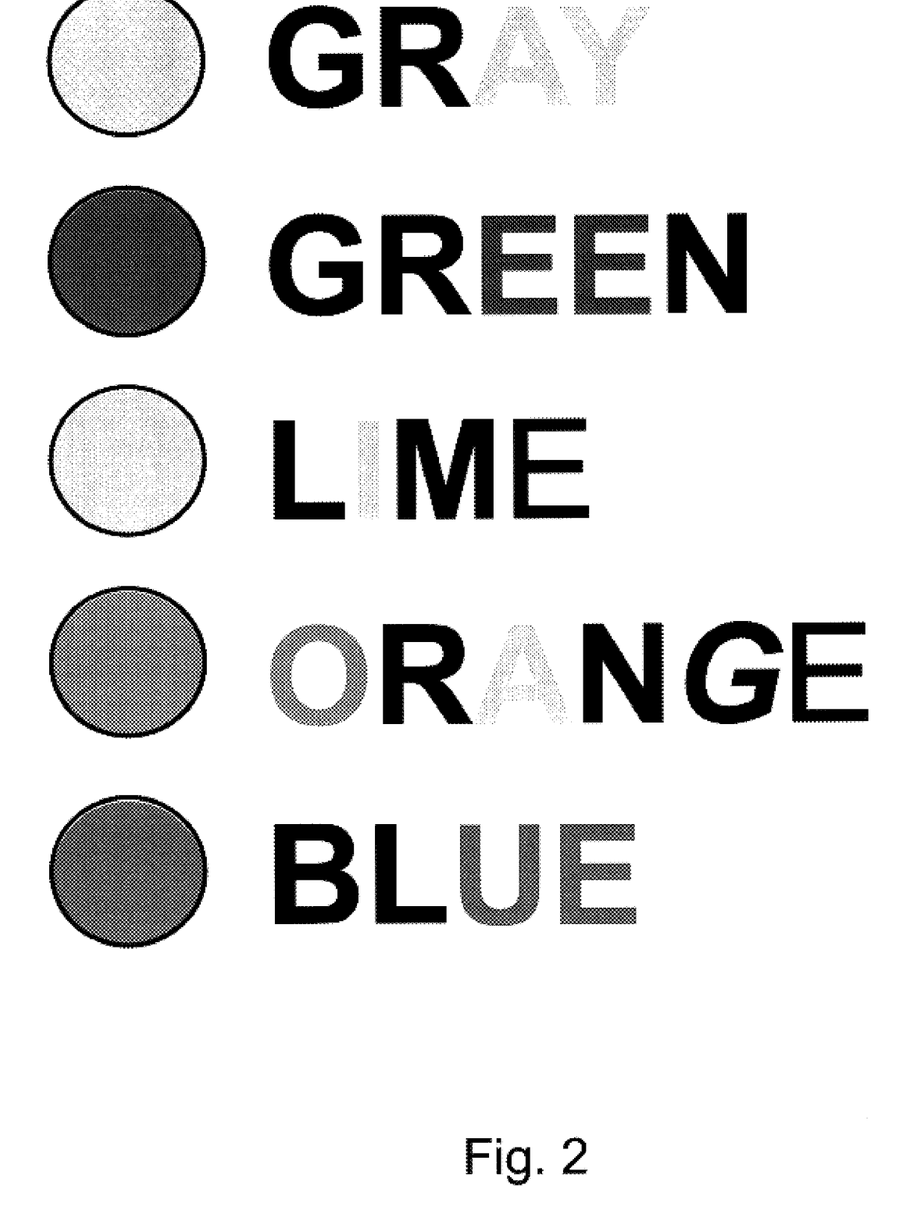
FIG. 2 portrays the colors and color names of the five long vowel sounds.
Figure 3:
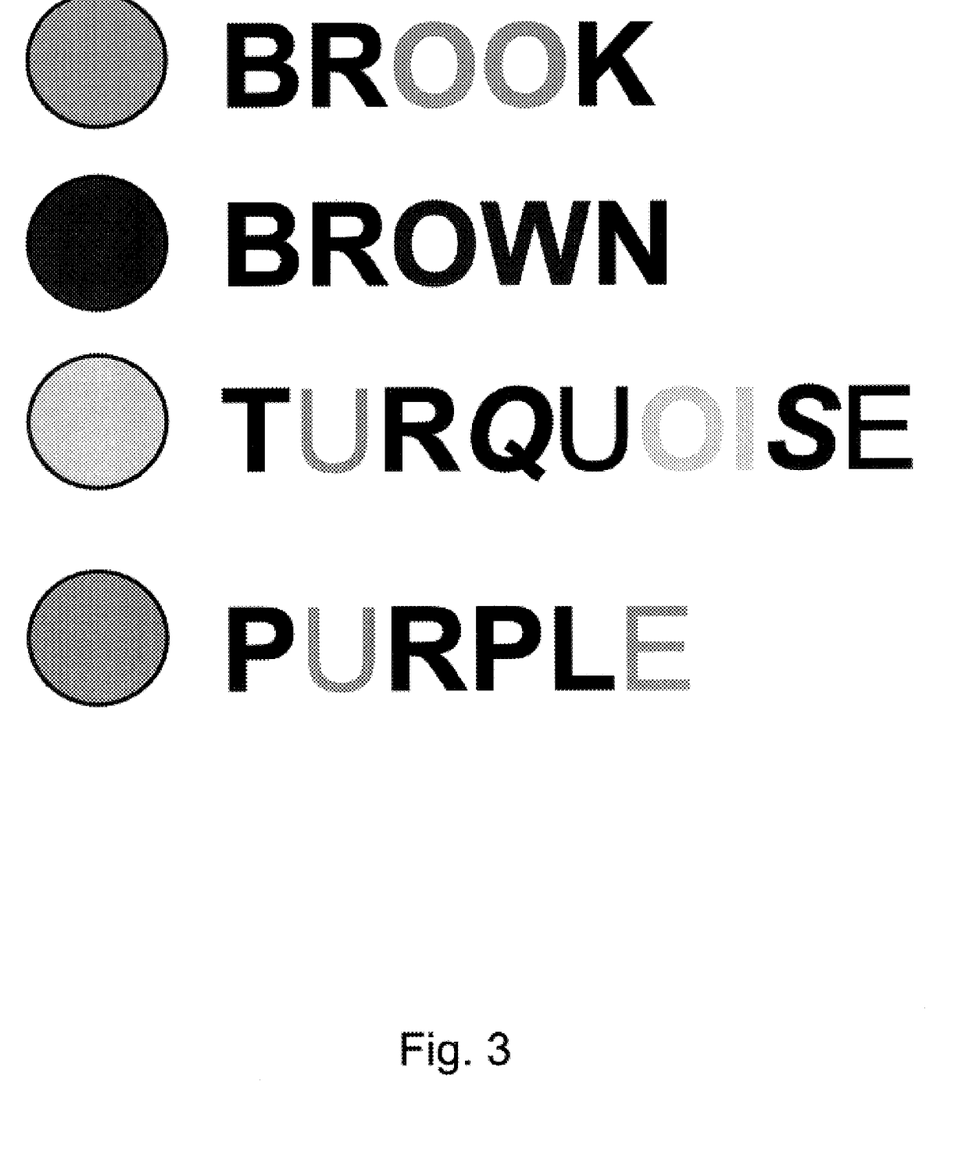
FIG. 3 portrays the colors and color names of the five irregular vowel sounds (purple representing the schwas in /er/ and /ul/).

This phonetics system can be embodied in any color-printable material, or visual display capable of color. The vowels have unique, assonant colors whose primary or secondary vowel sound rhymes with the vowel sound it represents. The conventional bracketing for speech-sounds (phonemes) is between two slash marks / /. A diphthong is a monosyllabic speech-sound containing two vowel qualities. A triphthong is a monosyllabic speech-sound containing three vowel qualities. FIGS. 1–3 also serve as the color key to FIGS. 4–6. The invention is applied to the text in FIGS. 1–6.

FIG. 1 portrays the colors and color names of the five short vowel sounds:

tan for short 'a', the vowel sound in "tan" is /ah/;
red for short 'e', the vowel sound in "red" is /eh/;
pink for short 'i', the vowel sound in "pink" is /ih/;
blond for short 'o', the vowel sound in "blond" is /aw/;
plum for short 'u', the vowel sound in "plum" is /uh/.

FIG. 2 portrays the colors and color names of the five long vowel sounds:

gray for long 'a', the vowel sound in "gray" is /ay/;
green for long 'e', the vowel sound in "green" is /ee/;
lime for long 'i', the vowel sound in "lime" is /aw-ee/ or diphthong /i/;
orange for long 'a', the vowel sound in "orange" is /oh/;
blue for long 'u', the vowel sound in "blue" is /oo/.

FIG. 3 portrays the colors and color names of the five irregular vowel sounds:

brook for short 'oo', the vowel sound in "brook" is /oo-uh/ or diphthong /oo/;
brown for diphthong /ou/, the vowel sound in "brown" is /aw-oo/;
turquoise for diphthong /oi/, the secondary vowel sound in "turquoise" is /oh-ee/;
purple for the schwas in /er/ and /ul/, the primary vowel sound in "purple" is in /er/ and the secondary vowel sound is in /ul/.

Common consonant sounds (phonemes) are represented by black letters. Each non-slanted, black letter of normal font thickness represents only one common sound (phoneme). The conventional common consonant sounds are not represented by a separate drawing. The common sounds of the consonants in this invention are as follows:

b is /b/ in bib
c is /k/ in cat
d is /d/ in dad
f is /f/ in fluff
g is /g/ in giggle
h is /h/ in hug
j is /j/ in jug
k is /k/ in kick
l is /l/ in little
m is /m/ in mom
n is /n/ in nine
p is /p/ in pop
q is /kw/ in queen
r is /r/ in roar
s is /s/ in sis
t is /t/ in tot
v is /v/ in vine
w is /w/ win won
x is /ks/ in fox
y is /y/ in yes, and
z is /z/ in zoo.

Figure 4:
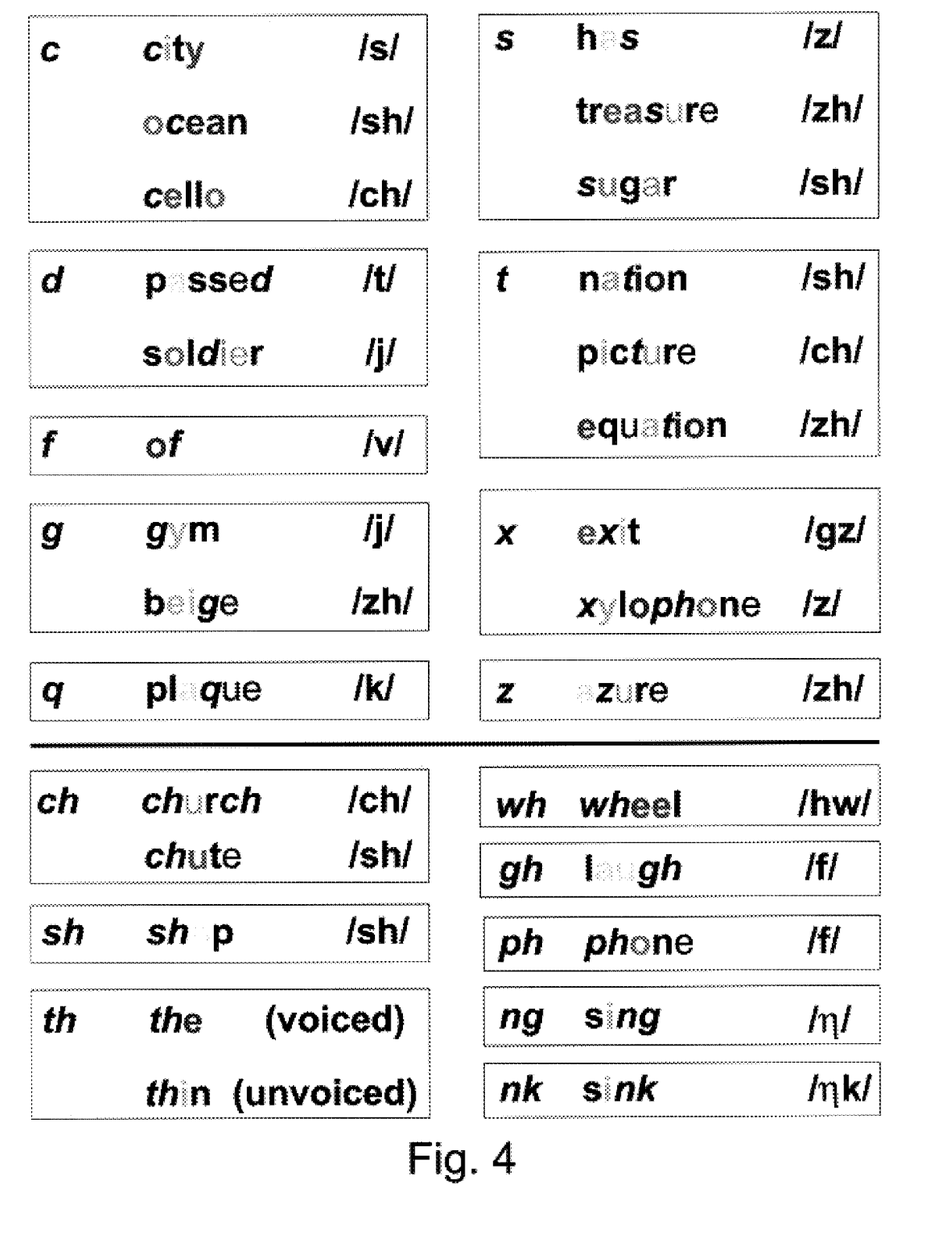
FIG. 4 portrays examples of the uncommon English consonant sounds of letters indicated by being slanted.

FIG. 4 portrays examples of uncommon consonant sounds indicated by black, slanted letters. There can be one or more uncommon sounds represented by each black, slanted consonant letter and letter pair; and they are presented in order of their predominant occurrence in American English words. The /s/ sound of 'c' is more often encountered than its /sh/ sound, and the /ch/ sound of 'c' is rare. But slanted letters 'ch' together represent /ch/ or rarely /sh/.

The /t/ sound of 'd' is often encountered in -'ed' endings, and its /j/ sound is rare. The only time 'f' sounds /v/ is in "of". The /j/ sound of 'g' is more often encountered than its /zh/ sound. Letter 'q' can sound /k/. The /z/ sound of 's' is more often encountered than its /zh/ sound, and its /sh/ sound is rare. The /sh/ sound of 'z' is more often encountered than its /ch/ sound, and its /zh/ sound is rare. The /gz/ sound of 'x' is more often encountered than its /z/ sound. Letter 'z' can sound /zh/. The horizontal line separates the single consonants from consonant digraphs.

Slanted letters 'ch' most often make the sound /ch/ and rarely /sh/. Slanted letters 'sh' represent the single phoneme /sh/. In a word like "mishap", letters 'sh' would not be slanted, but in "misshapen" they would. There are two traditional phonemic symbols for the digraph 'th': the one pronounced without the voice is /th/, and the one pronounced with the voice has a slash through the letters 'th', yet a slash typically means "not"; therefore these confusing symbols were not used. The digraph 'wh' actually aspirates before the /w/. Slanted 'gh' and slanted 'ph' represent /f/. The symbol /η/ is a modified International Phonetic Alphabet's symbol for /ng/ used in this invention to demonstrate its own phoneme as well as its relation to 'nk'; otherwise the phonemic symbol for 'nk' would have been an awkward /ngk/.

Double consonants representing one consonant sound, like 'ff' for /f/ and 'ss' for /s/, are not slanted. Therefore letters 'ck', though representing just one /k/ sound, are not slanted.

Figure 5:
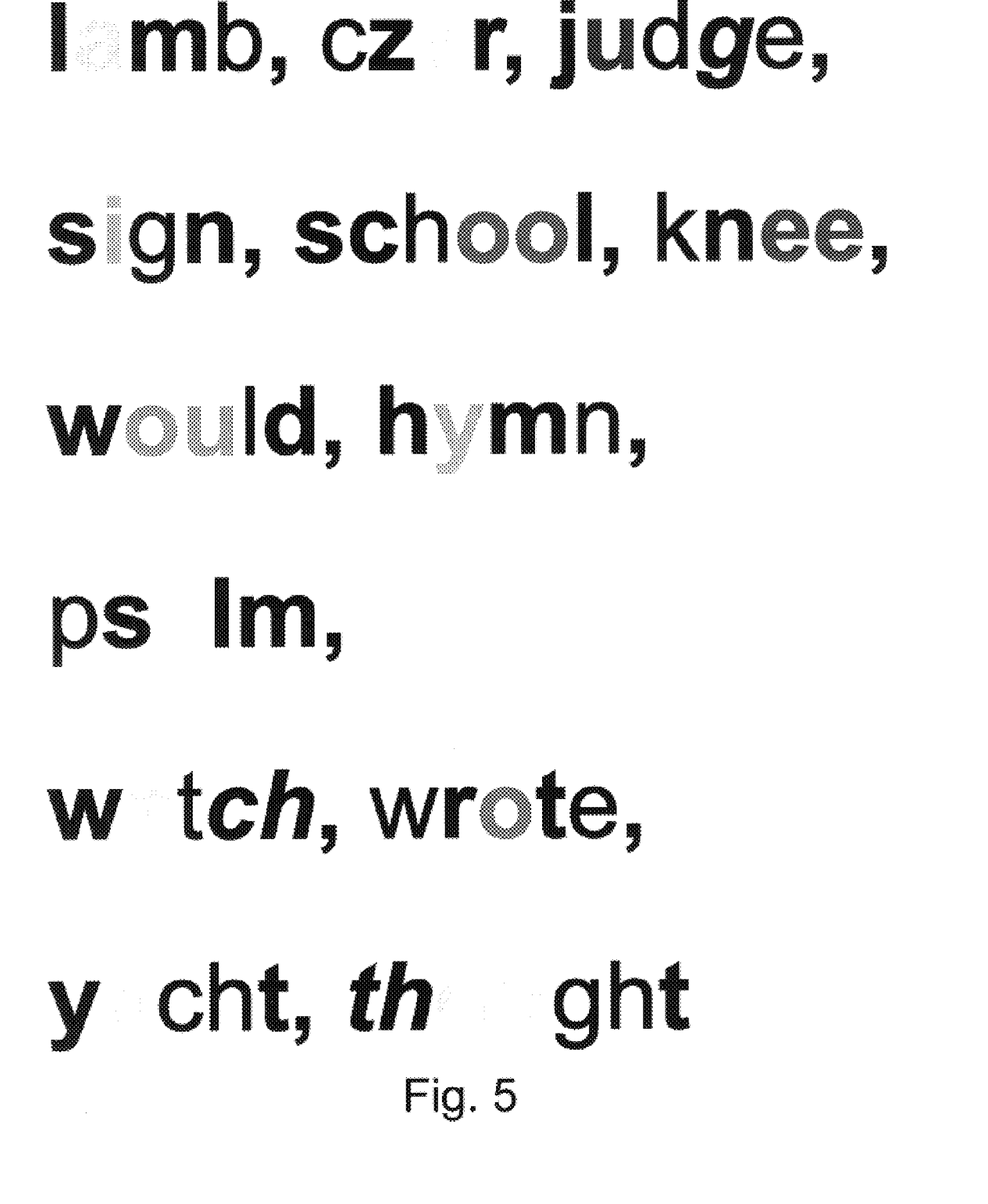
FIG. 5 portrays examples of silent letters in words indicated by being thin.

FIG. 5 portrays examples of silent letters in words. Silent letters are thinner than letters that represent sound. The silent letters are represented in alphabetical order: 'b' in "lamb", 'c' in "czar", 'd' and 'e' in "judge", 'g' in "sign", 'h' in "school", 'k' in "knee", 'l' in "would", 'n' in "hymn", 'p' in "psalm", 't' in "watch", 'w' in "wrote", 'ch' in "yacht", and 'gh' in "thought".

Figure 6:
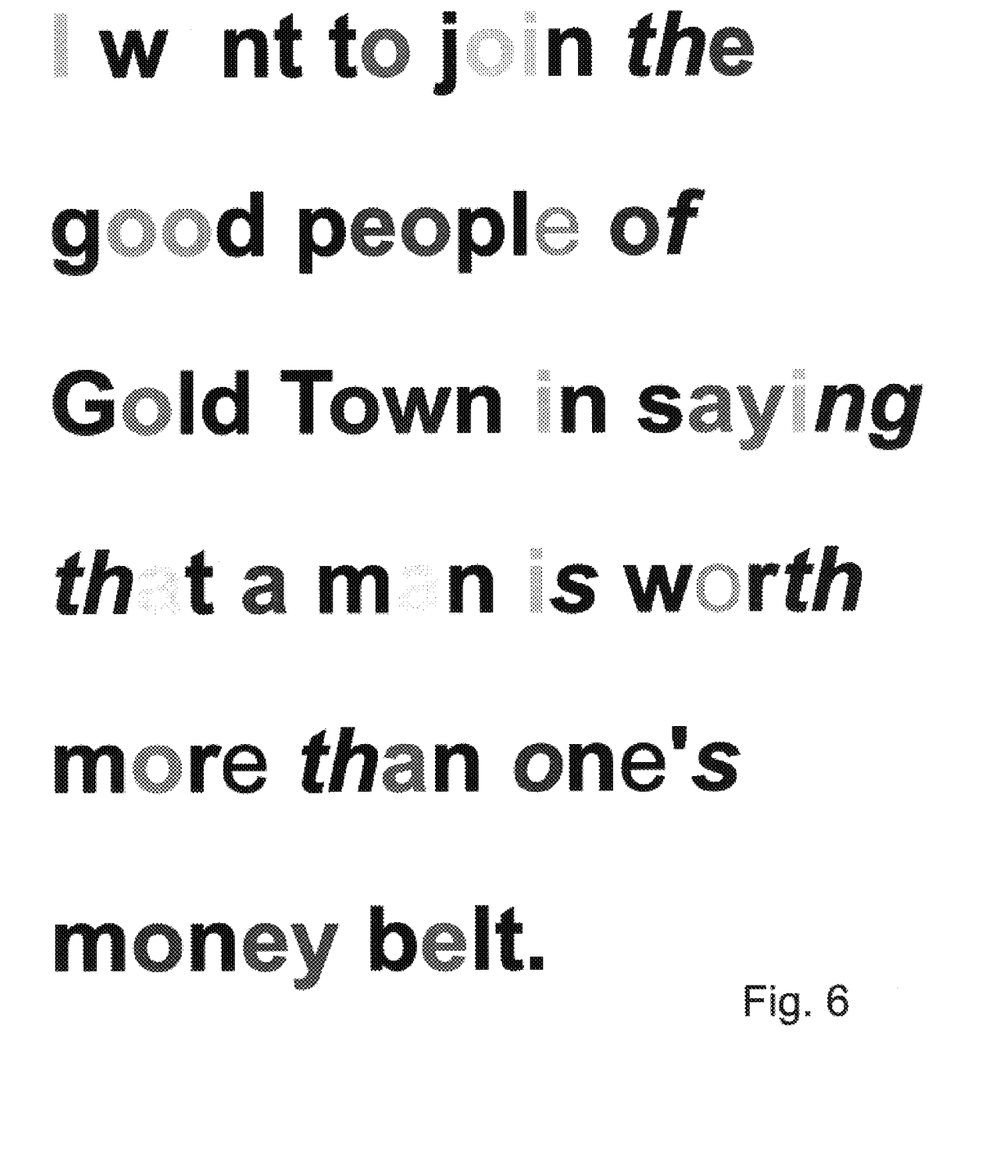
FIG. 6 portrays the application of the invention to a sentence.

FIG. 6 portrays the application of the invention to a sentence. All fourteen assonant colors and black have been applied here, as have the common, uncommon (slanted as shown in FIG. 4) and silent (thin as shown in FIG. 5) aspects of the invention. The color assonance is as follows:

I (lime) want (blond) to (blue) join (turquoise) the (plum) good (brook) people (green—purple) of (plum) Gold (orange) Town (brown) in (pink) saying (gray—pink)

that (tan) a (plum) man (tan) is (pink) worth (purple) more (orange) than (red) one's (plum) money (plum—green) belt (red).

Each syllable has only one color, making it easy to recognize all the two-syllable words in the sentence: "people", "saying", and "money".

OPERATION OF INVENTION

This color-assonant phonetics system can be displayed on a white background on any color-receptive surface or visual display (paper, wood, cardstock, plastic, tile, metal, cloth, film, film screens, computer monitors, televisions, and the like).

Clarification of Concepts and Terms

In order to establish sound equivalency, Table 1 has been compiled:

TABLE 1

| Color | Sound | Description | IPA | Diacritical |
|---|---|---|---|---|
| tan | /ah/ | short 'a' | [æ] | ă, à |
| red | /eh/ | short 'e' | [ɛ] | ĕ, Â, Ä |
| pink | /ih/ | short 'i' | [I] | ĭ |
| blond | /aw/ | short 'o' | [ɑ], [ɔ] | ŏ, ô, Ä |
| plum | /uh/ | short 'u' | [ə], [ʌ] | ŭ, à, ö |
| gray | /ay/ | long 'a' | [e], [eI], [ei] | ā, ē |
| green | /ee/ | long 'e' | [i] | ē |
| lime | /aw-ee/ | long 'i', diphthong 'i' | [aI], [ai] | ī |
| orange | /oh/ | long 'o' | [o] | ō, ö |
| blue | /oo/ | long 'u' | [u] | ū, Ü |
| brook | /oo-uh/ | short 'oo', diphthong /oo/ | [U] | o͝o |
| brown | /aw-oo/ | diphthongs /ow/ and /ou/ | [aU], [au] | ou |
| turquoise | /oh-ee/ | diphthongs /oy/ and /oi/ | [ɔI], [ɔi] | oi |
| purple | e in /er/ | the schwa in /er/ | [ə], [ɜ] | ẽ, ĩ, Ũ, û |
| purple | u in /ul/ | the schwa in /ul/ | [ə], [l] | ə |

Referring to Table 1, typical diacritical marks are displayed, there being no agreed-upon standard for diacritical marks. Conventionally, phonemes are placed between slash marks / /, and International Phonetic Alphabet (IPA) symbols are placed between brackets [ ].

Referring to FIG. 1, in some dialects, the vowel sound in "pink" might not clearly be pronounced as /ih/. When a short vowel sound is followed by /ŋk/, /ŋ/, or /g/; as in "pink", "ping", and "pig", the vowel sound may tend to distort toward a long vowel sound. But Webster's Dictionary rightly verifies the letter 'i' in "pink" is short. Linguistically speaking, letters 'ng' in "ping" is a digraph: one new sound represented as /ŋ/. This new sound is represented by the letter 'n' in 'nk', but for the sake of simplicity, both letters 'nk' in "pink" are slanted, though not a true digraph.

In FIG. 2, note that only the 'g' is slanted in "orange" to represent its uncommon sound /j/; thus the end of the word is /nj/, not /ŋ/ as when both letters 'ng' are slanted. Note the vowel digraph 'ue' in "blue" is colored blue, as opposed to making the 'e' silent. Vowel digraphs are colored as one vowel sound. Note that 'ay' is considered a vowel digraph in "gray". Letters 'y' and 'w' are colored when they function in vowel digraphs as vowel sounds.

Regarding FIG. 3, since no commonly known color name with the short /oo/ sound exists, the name "brook", indicative of water flowing in a brook, is used and given an aquamarine color.

Notice in "turquoise" that the 'q' is slanted to represent its uncommon sound /k/. Normally 'q' makes its common sound /kw/, and the 'u' is considered silent; thus breaking from the traditional representation of 'qu' representing /kw/. This is done because 'qu' does not always represent /kw/, as in "antique".

This invention distinguishes the sounds of schwas. Webster's Dictionary defines schwa as "the mid-central, neutral vowel sound typically occurring in unstressed syllables in English, however spelled, as the sound of a in alone and sofa, e in system, i in easily, o in gallop, u in circus." It is also described on its inside front page: "schwa occurs in unaccented syllables to indicate the sound of the reduced vowel in alone, system, easily, gallop, circus". The problem is that a non-native speaker would not know in what manner to reduce the vowel. This invention colors the thick, unaccented letters plum (for /uh/) in "alone", "gallop", and "circus"; and colors them pink (for /ih/) in "system" and "easily".

Webster's Dictionary notes in its introductory "How to Use This Dictionary": "the (l) can be syllabic, as in little, cradle, and tunnel (lit'l, crad'l, tun'l). For entries showing syllabic /, alternate pronunciations with schwa can also be heard." This invention clearly shows the heard schwa, as is demonstrated in the final 'e' in "purple" and "people" (FIG. 6), but recognizes the letter's "silent" nature, since the schwa is inherent in the letter 'l' itself. These "silent schwas" act as placeholders, like the zero does in our numeral system. "Silent schwas" also appear in vowel letters preceding letters 'n' and 'r' as in the words "button" and "better". The letter 'e' before 'r' in "better" would be thin purple. The letter 'o' in "button" could be thin pink or plum, depending on pronunciation.

Letters 'r' and 'l' are referred to as glides, slides, semi-vowels, and vowel-consonants in linguistics. In the vowel-consonants /er/ and /ul/, the schwa is actually a part of the letter and impossible to detach from it. In some words that schwa is overpowered by another vowel sound, as the /oh/ does in "orange" (in FIG. 2) and "Gold" (in FIG. 6). In some words, that schwa is clearly represented by a vowel letter directly before or after the letter 'r' or 'l' as in "tu_r_quoise" (in FIG. 3) and "p_o_lice", or "theat_re_" and "peop_le_" (in FIG. 6). In these cases the vowel letter is colored purple in a thin style in recognition that the schwa is inherent in the letter'r' or 'l', and has created a syllable. This is helpful in distinguishing triphthongs (three vowel sounds combined) from diphthongs (two vowel sounds combined). "Flour" is a one syllable word with a triphthong: the diphthong 'ou' would be colored brown (the schwa being inherent in the 'r'). "Flower" is a two syllable word: the diphthong 'ow' would be colored brown and the 'e' would be thin purple.

FIG. 4 is a reference chart for uncommon English consonant sounds. It is to be understood that the list of uncommon consonant sounds represents a typical American English vocabulary. It does not contain all the uncommon consonants and alternative sounds represented in Webster's Dictionary. Some phonetics systems add diacritical marks to differentiate between the uncommon sound of the consonant letter(s) to be an exact pronunciation aid, but this invention does not distort the flow of text with extra markings.

This system can be easily applied to foreign words that are commonly used by American English speakers to demonstrate a consonant does not make its common sound, as in the Spanish words "javelina" and "quesadilla".

It is to be understood that the list in FIG. 5 represents examples of silent letters for a typical American English vocabulary. It does not contain all the possible silent letters for foreign words, or for obscure words such as "mnemonic" which has a silent 'm'.

FIG. 6 portrays one possible pronunciation of the sentence. This invention is adaptable to differences in pronunciation, emphasis, and dialect. If "than" was pronounced with the /ah/ vowel instead of /eh/, then the 'a' in "than" would be colored tan. If "the" was emphasized, the 'e' in the word "the" would be colored green. If the word "a" was emphasized, the word "a" would be colored gray. Silent letters are commonly represented in other texts with an apostrophe (sayin'). If /ng/ in the word "saying" is replaced by /n/ in a dialect, then letters 'ng' would not be slanted, and letter 'g' would be thin to indicate that the 'g' was silent.

When a vowel has an unwritten consonant sound preceding it, then it is slanted. The preceding sound of the word "one's" is /w/. The preceding sound of the word "use" is /y/.

Letters 'eo' are not a common vowel digraph taught in traditional phonics, but this invention clearly shows they represent the /ee/ sound in "people". Letter's 'a', 'e', and 'o' are not commonly taught to make the /uh/ sound, but are clearly colored plum in the words "a", "the", and "of", "one's", and "money". The silent letter 'e' in "more" and "one's" clarify these words have only one syllable. The digraphs 'th' and 'ng' are indicated by slanted letters.

The Ariel font is used in FIGS. 1–6. Ariel has very subtle differences between its thin (normal), thick (bold) and thick-slanted (bold-italic) styles. To provide more distinctiveness between the styles, a font like New Century Schoolbook might be used instead.

Directions for Applying Invention to Text

1. Using an art/graphics computer program, select a font which has thick, thin, and thick-slanted styles; and type your text using the thick, black font.
2. Make all the silent letters (including silent schwas) thin.
3. Establish your color palette according to table 2 or 3 for professional printing.

For displays using the Red, Green, Blue format, Table 2 offers example percentages of the colors.

TABLE 2

| Color | R | G | B |
|---|---|---|---|
| Tan | 86 | 71 | 60 |
| Red | 100 | 0 | 0 |
| Pink | 96 | 77 | 81 |
| Blond | 95 | 87 | 29 |
| Plum | 49 | 0 | 49 |
| Gray | 50 | 50 | 50 |
| Green | 0 | 60 | 0 |
| Lime | 55 | 80 | 0 |
| Orange | 100 | 50 | 0 |
| Blue | 0 | 39 | 64 |
| Brook | 0 | 60 | 60 |
| Brown | 58 | 40 | 100 |
| Purple | 79 | 45 | 100 |
| Turquoise | 56 | 93 | 100 |

For displays using the Cyan, Magenta, Yellow, Black format, Table 3 offers example percentages of the colors.

TABLE 3

| Color | C | M | Y | K |
|---|---|---|---|---|
| Tan | 15 | 30 | 40 | 0 |
| Red | 0 | 93 | 100 | 0 |
| Pink | 0 | 30 | 5 | 0 |
| Blond | 0 | 0 | 80 | 10 |
| Plum | 62 | 95 | 0 | 1 |
| Gray | 50 | 36 | 36 | 16 |
| Green | 84 | 0 | 100 | 0 |
| Lime | 51 | 0 | 98 | 0 |
| Orange | 0 | 62 | 96 | 0 |
| Blue | 100 | 50 | 0 | 0 |
| Brook | 89 | 3 | 46 | 0 |
| Brown | 28 | 55 | 85 | 23 |
| Purple | 42 | 51 | 0 | 1 |
| Turquoise | 37 | 0 | 9 | 0 |

4. Color the vowels using FIG. 1–3 as the color-assonance key, according to their pronunciation in the text.
   a. All syllables must contain one, and only one, color.
   b. All letters representing the vowel sound in one syllable are to be colored the same. Example: letters 'eau' in "beautiful" would all be colored blue.
   c. Some purple, silent schwa letters will come after letter 'r' or 'l', but are colored to signify the syllable.
   d. Color letters 'w', and 'y' when they are part of the vowel digraph.
5. Slant consonant digraphs that create new phonemes.
6. Slant all consonants that do not represent their common sound.
7. Slant any vowels that have an unwritten consonant sound preceding them. In the word "beautiful", the /oo/ sound is preceded by /y/, and so all letters 'eau' representing the one /oo/ phoneme would all be slanted. To change the three syllable word "beautiful" to a four syllable word according to a dialect, letters 'ea' would be colored green, and the following letter 'u' would be slanted blue. [The order of #5–7 is important, otherwise you might incorrectly slant the letter 'u' in "sugar" before you have slanted the letter 's' (see FIG. 4).]

Following these steps, those skilled in the art can apply this invention to text.

CONCLUSIONS, RAMIFICATIONS, AND SCOPE

This invention greatly simplifies pronunciation and reading of text. The invention itself is simple. It can be easily taught and understood. The colorful texts are inviting and stimulating to beginning readers. The advantages of this phonetics system are evident:

(a) It provides clear, immediate, visual distinction between consonant sounds and vowel sounds.

(b) It provides one-to-one correspondence of an assonant color to each vowel sound including schwas.

(c) It provides clear, immediate recognition of the number of syllables in each word.

(d) It visually distinguishes all of the different vowel sounds from each other regardless of spellings.

(e) It provides clear, immediate recognition of silent letters.

(f) It provides inferential visual cues instead of complex rules, thus enabling students to spend less time learning the system and more time using the system to aid their pronunciation and reading.

(g) It provides a readable text to both those who know the system and those who do not, without distorting text with diacritical marks.

(h) It can be used in many mediums, fonts, and sizes.

The preferred embodiments of professional color-printing on white paper and of color display on computer monitor are already incorporated in the Color Phonics product. It is hoped to soon have the invention applied to text in children's books. The invention can be applied to transparency film to be shown on overhead projectors. Color-markers can be used to apply the invention to white paper or to erasable white boards.

Although particular embodiments of the present invention have been illustrated and described and incorporated into a product, it will be apparent to those skilled in the art that various changes and modifications can be made without departing from the scope of the present invention: various fonts of various sizes on various printable mediums and visual displays. It is therefore intended to encompass within the appended claims all such changes and modifications that fall within the scope of the present invention.

I claim:

1. A phonetics method of the American English language comprising the English alphabet:
   a) enhancing single letters and letter groupings representing each vowel sound with a color whose name has assonance to that vowel; the color set being:
      tan for /ah/ called short 'a'
      red for /eh/ called short 'e'
      pink for /ih/ called short 'i'
      blond for /aw/ called short 'o'
      plum for /uh/ called short 'u'
      gray for /ay/ called long 'a'
      green for /ee/ called long 'e'
      lime for diphthong /i/ called long 'i'
      orange for /oh/ called long 'o'
      blue for /oo/ called long 'u'
      brook (an aquamarine color) for diphthong /oo/ called short 'oo'
      brown for diphthong /ou/
      turquoise for diphthong /oi/
      purple for the schwa in /er/, and
      purple for the schwa in /ul/;
   b) indicating a vowel sound preceded by an unwritten /w/ or /y/ by a single slanted colored letter or slanted colored letter group.
   c) providing a thin font to all silent letters, including purple schwa letters, and
   d) modifying black letters representing uncommon consonant sounds with slanted letters,
   whereby said method aids reading and pronunciation.

2. The phonetics method of claim 1 wherein consonant sounds are colored black, and the common sounds of single consonant letters are
   b is /b/ in bib
   c is /k/ in cat
   d is /d/ in dad
   f is /f/ in fluff
   g is /g/ in giggle
   h is /h/ in hug
   j is /j/ in jug
   k is /k/ in kick
   l is /l/ in little
   m is /m/ in mom
   n is /n/ in nine
   p is /p/ in pop
   q is /kw/ in queen
   r is /r/ in roar
   s is /s/ in sis
   t is /t/ in tot
   v is /v/ in vine
   w is /w/ in won
   x is /ks/in fox
   y is /y/ in yes, and
   z is /z/ in zoo;
   and the uncommon consonant sounds are indicated by slanted single black letters:
   c as /s/, /sh/, or /ch/
   d as /t/ or /j/
   f as /v/
   g as /j/ or /zh/
   q as /k/
   s as /z/, /zh/, or /sh/
   t as /sh/, /ch/, or /zh/
   x as /gz/ or /z/
   z as /zh/;
   and slanted black letter pairs:
   ch as /ch/ or /sh/
   t sh as /sh/
   th as voiced /th/ or unvoiced /th/
   wh as /hw/
   gh as /f/
   ph as /f/
   ng as /ng/, and
   nk as /nk/.

3. The phonetics method of claim 1 wherein uncommon consonant sounds for single letters and letter pairs are indicated by slanted black single letters and slanted black letter pairs in foreign words adopted into the English vocabulary.

* * * * *

UNITED STATES PATENT AND TRADEMARK OFFICE
CERTIFICATE OF CORRECTION

PATENT NO. : 6,126,447
DATED : October 3, 2000
INVENTOR(S) : L. Eve Engelbrite

It is certified that error appears in the above-identified patent and that said Letters Patent is hereby corrected as shown below:

Col. 3, line 39 change "orange for long 'a'" to —orange for long 'o' —.

Col. 4, line 12 change "/w/ win won" to —/w/ in won—.

Col. 10, line 17 change "/ks/in fox" to —/ks/ in fox—.

Col. 10, line 35 change "t sh as /sh/" to —sh as /sh/—.

Signed and Sealed this

Eighth Day of May, 2001

*Attest:*

NICHOLAS P. GODICI

*Attesting Officer*  *Acting Director of the United States Patent and Trademark Office*